Patent 3,594,328

3,594,328
PROCESS FOR THE ENCAPSULATION OF DISPERSIBLE MATERIALS
Luzius Schibler, Riehen, Switzerland, assignor to Ciba Limited, Basel, Switzerland
No Drawing. Continuation of application Ser. No. 564,543, July 12, 1966. This application Dec. 9, 1969, Ser. No. 880,476
Claims priority, application Switzerland, Aug. 2, 1965, 10,861/65
Int. Cl. B01j *13/02;* B44d *1/02*
U.S. Cl. 252—316                                      5 Claims

ABSTRACT OF THE DISCLOSURE

An encapsulation process is provided wherein the substance to be encapsulated is dispersed in a liquid with which it is substantially immiscible in the presence of a tenside capable of forming a compound that is insoluble in the dispersing liquid and thereafter the tenside in the dispersion, which is in association with the substance, is converted into the irreversibly insoluble state to encapsulate the substance. Particularly suitable as tensides are the surface-active, cross-linkable aminoplasts, preferably surface-active, etherified methylolmelamines or the corresponding methylolureas.

---

This application is a continuation of my copending application S.N. 564,543, filed July 12, 1966, and now abandoned.

The present invention provides a process for encapsulating a substance which has been finely dispersed in a liquid with the aid of a tenside by forming a capsule shell that is insoluble in the liquid. The process of this invention is characterized in that the substance to be encapsulated is dispersed in the presence of a tenside capable of forming a compound that is insoluble in the dispersing liquid and the tenside in the dispersion is converted into the irreversibly insoluble state.

The starting material used in the present process is a two-phase system consisting of a liquid, external (continuous) phase which may be also referred to as the dispersant, a solid, liquid or gaseous substance, finely dispersed in the continuous phase, constituting an internal (discontinuous) phase, and a tenside whose initial purpose is to produce and maintain the finely dispersed state.

The external phase or dispersing liquid may be an aqueous medium, consisting, for example, of water in which the tenside and optionally further substances are dissolved. Alternatively, the dispersing liquid may be an organic solvent immiscible with water in which the tenside to be used is dissolved. As relevant examples there may be mentioned aliphatic and aromatic hydrocarbons and halogenated hydrocarbons such as benzene, toluene, chlorobenzene, tetra- and decahydronaphthalene, trichloroethylene and carbon tetrachloride.

If the internal phase consists of a solid substance, the latter must be dispersed in the presence of the tenside and, if necessary, ground to a fineness that gives rise to a stable dispersion.

If the internal phase is a liquid, it must be insoluble in, or at least immiscible with, the external phase. Quite generally, it may be said that the external and the internal phase should be selected so that neither an appreciable amount of one phase is dissolved by the other nor undesirable chemical reactions intervene. As dispersed solids there may be used a wide variety of products such as pigments, fillers, pesticides, aromas, fats, waxes, paraffin wax, fertilizers or pharmaceuticals. As liquid substances to be emulsified there may be used undiluted, liquid substances, for example paraffin oil or solutions of liquid or solid substances in suitable solvents. In general, preferred use is made of liquids that have a high boiling point or are sparingly volatile. As relevant examples there may be mentioned phthalic acid dibutyl ester and phosphoric acid tricresyl ester. Thus, organic solvents that are sparingly soluble in water may be used in the present process in two different ways, first as dispersing liquids for an aqueous internal phase (water-in-oil emulsion) and then as internal phase when, in general, they contain at least one further substance, for example a vat dyestuff in solution (oil-in-water emulsion). Likewise suitable as external or internal phase are water and aqueous solutions. An internal aqueous phase may contain, for example, salts or dyestuffs, in solution. It is also possible—as is the case for instance with fats, waxes or paraffin waxes—that the internal phase formed by these substances is at first liquid because of a high working temperature used so that there is obtained an emulsion which on cooling turns solid. Similarly, substances dissolved in aqueous solutions emulsified in an external non-aqueous phase may crystallize out within the capsules during the process or subsequently.

The tensides to be used in the present process must possess the following properties:

(a) They must be predominantly soluble in the external phase or liquid dispersant, but less soluble in the internal phase;
(b) as demanded by the designation "tenside" they must be surface-active;
(c) they must be capable of forming a compound that is insoluble in the external phase.

To ensure surface-activity of the compounds they must contain a lyophobic and a lyophilic molecule portion, thus in the case where water forms the external phase of the system they must contain both hydrophobic and hydrophilic groups. Furthermore, they must contain reactive groups so that by reaction with other substances present in the dispersion or preferably with themselves, a substantial increase in molecule size takes place, whereby the formation of a capsule shell about the finely dispersed internal phase is caused. At the same rate as the shell is formed, the surface-activity diminishes of course, but this activity is no longer required when by the progressive formation of the capsule shell a permanent separation of the dispersed particles has taken place. Depending on the constitution of the individual tenside used this transition from the soluble to the irreversibly insoluble state can be initiated and finalized by a variety of steps. There may specially be mentioned heating, adjustment of certain pH values, addition of substances that react with the tenside to form products of high molecular weight, and above all the addition of so-called curing catalysts.

Particularly suitable as tensides for use in the present process are surface-active, crosslinkable aminoplasts, preferably surface-active, etherified methylolmelamines or corresponding methylolureas. Being aminoplasts these compounds can be converted into the irreversibly insoluble state. Specific atomic groupings impart tenside action to them. Depending on the dispersing liquid chosen the same residue may act as a lyophilic or a lyophobic group. When aqueous dispersants are used, the residue of a higher alcohol, with which the aminoplast may be etherified, acts as the lyophobic—in this case a hydrophobic—constituent, whereas when the same tenside is dissolved in an organic solvent, such as toluene, the residue of a higher alcohol must be looked upon as the lyophilic constituent. The tenside molecule component which counteracts the solving or charging of the actual aminoplast component may consist of basic, acidic or neutral groups; likewise acceptable are combinations of basic or of acidic groups with neutral groups. Basic groupings are formed, for example, by modification with triethanolamine, whereas acidic groups may be introduced by reaction with sodium bisulphite. Finally, the introduction of polyglycol residues gives rise to neutral, curable tensides. In the latter the polyglycol residue generally forms a preponderant share, for example so that neutral reactive tensides derived from urea contain up to about 400% by weight (referred to urea) of polyglycol residues. However, even in the case of urea derivatives modified with basic or acidic groups the share of these modifying residues is advantageously at least 50% and preferably from 90 to 200% (likewise referred to urea). Similar conditions obtain with melamine compounds.

There follow three examples of different types of curable tensides suitable for use in the present process:

(1) Aminoplasts, especially melamines, containing etherified methylol groups, whose methylol groups are partially etherified with hydroxy compounds of the formula

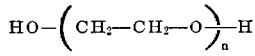

(where $n$ is a number from 1 to 100). These compounds are otherwise advantageously etherified with monoalcohols containing 4 to 7 carbon atoms; in the dihydroxy compounds of the indicated formula $n$ is preferably at least 20.

(2) Water-soluble derivatives of methylolureas or methylolmelamines containing residues of monohydroxy compounds with at least 4 carbon atoms, residues of alcohols containing at least two hydroxyl groups and Me—O$_3$S groups bound with carbon atoms, where Me is an alkali metal.

(3) Condensation products obtained by condensing together (a) about 1 mol of hexamethylolmelamine hexamethyl ether,
(b) about 2 mols of a higher fatty acid such as stearic acid, and
(c) about 1 mol of triethanolamine and converting the resulting basic condensate with acetic acid into the salt.

The proportions in which the substances required for the present process are to be used may vary within wide limits. As is generally the case with disperse systems, the total volume of the internal phase, compared with that of the external phase, may on the one hand be as small as desired or, on the other hand, it may be substantially greater. What is of importance is that an amount of dispersing liquid sufficient to ensure free mobility of the disperse phase must be present. In general, this ratio between these volumes (internal::external phase) ranges from about 1:10 to 1:0.1. The amount of the reactive tenside should be chosen so that it is sufficient to form a dispersion, especially an emulsion, and then of a sufficiently thick capsule wall. This depends not only on the constitution of the tenside but of course also on the ratio external:internal phase which in turn determines the amount of tenside required. For example—at the volumetric ratios just mentioned there may be used for every litre of dispersion about 10 to 500 g. of the tenside. If necessary, it is easy to determine the most suitable proportions by comparative tests. The type and amount of tenside, and the shear forces set up during dispersing govern especially with emulsions—the size of the capsules formed; in this connection special attention should be paid to the fact that for a given content of internal phase, when the number of particles is increased $n$-fold (diminution of the particle volume) the total surface increases at the ratio $$1 : \sqrt[3]{n}$$

Concerning the thickness of the capsule wall it must be borne in mind that the reactive, resin-forming portion of the tenside molecule now produces the shell, whereas the residual, modifying groups, especially of the polyglycol ethers in the case of neutral tensides, are eliminated and remain dissolved in the one, preferably the aqueous, phase.

The present process may also be performed with mixtures of different reactive tensides or reactive and non-reactive tensides as dispersants, provided the tensides selected are compatible with one another. Thus, for example, anionic tensides may be combined with non-ionic tensides but in general not with cationic tensides.

In the case of the aminoplast tensides the encapsulation is advantageously performed at a pH value from 2 to 5 and at room temperature or with moderate heating, during which, depending on the reactivity of the two-phase system, the batch is stirred rapidly or more slowly. For adjusting the pH value mentioned there are particularly suitable formic, acetic, citric acid and other organic or inorganic acids; also acid or hydrolyzable salts such as aluminium sulphate, titanium oxychloride, ammonium salts of strong acids capable of forming acid in the presence of formaldehyde, such as ammonium chloride, nitrate or sulphate, or a primary phosphate. There may also be used oxidants capable of oxidizing formaldehyde to formic acid, such as hydrogen peroxide. All these substances are so-called aminoplast curing agents.

The conversion of the reactive tenside into the capsule shell is generally recognized by the formation of a whey-like mass which separates from the external phase and can be isolated by decanting, centrifugation or filtration, whereupon it can be washed with water or with an organic solvent. Whereas in the original emulsion or dispersion of solid substances, provided the latter are sufficiently finely dispersed, both phases pass side by side through a filter, the completion of the encapsulation is generally recognized by the fact that only the external phase passes through the filter, whereas the capsules are retained by it. Products formed by elimination during the conversion of the tenside into the insoluble state, for example polyglycol ether or lauryl alcohol, are always present in the filtrate and can be quantitatively removed with water or organic solvents, depending on the choice of the external phase.

After removal of the external phase and the by-products formed within it, in some cases even without such steps, or without complete removal thereof, the resulting capsule mass can be stored, for example, in the form of a paste-like or salve-like filter cake, dried in a suitable manner or converted in any other manner into a form suitable for its use.

Fine-particle capsules may be redispersed, in which case, to distinguish it from the original primary dispersion or emulsion, the resulting mass may be called a secondary dispersion or emulsion. Secondary dispersions may likewise be manufactured with reactive tensides, provided it is ensured that they do not pass into the insoluble state during the storing of the dispersion. Thus, when tensides based on aminoplasts are used, the pH value of the system may again be raised to 7 to 8, whereby a readily storable preparation is obtained.

The present process has various advantages. It may be used both with oil-in-water and water-in-oil systems. By a suitable choice of the tenside used not only the kind of the emulsion but also its particle size can be considerably influenced. This is particularly valuable because for nearly all purposes a maximum particle size of less than 10μ, or even below 1μ, is of advantage. Since, especially in aqueous systems, the dispersity depends in the first place not on the agitator but on the efficacy of the tenside, it is possible to prepare sufficiently fine emulsions which have an almost indefinate shelf life. When an acid-forming catalyst is added to such an emulsion, the conversion of the aminoplast tenside into the insoluble state and with it the encapsulation may be carried out with only slight stirring or even with the batch left static.

Of special value are capsules filled with aqueous solutions, which, while they have been prepared in an organic medium, are subsequently freed from the organic solvent and dispersed in a second, aqueous phase. In this manner cellular units are obtained which have structures resembling those of biological forms.

Unless otherwise indicated, parts and percentages in the following manufacturing instructions A to E for reactive tensides and in the examples are by weight.

Manufacturing instruction A

A mixture of 126 parts of melamine and 600 parts of formaldehyde solution of 30% strength is heated at a pH value of 8.2 for about ½ hour at 90° C., until the initially clear solution begins to turn turbid. 1000 parts of n-butanol and 8 parts of glacial acetic acid are then added and the mixture is refluxed until the resin solution has cleared again. The butanol and the water are then distilled off through a descending condenser until all water has passed over and the distillate runs clear in the cold. 800 parts of polyethyleneglycol of molecular weight 4000 are then added and the batch is heated further under vacuum to 90° C., during which more butanol and water distil off. Heating is continued until a specimen of the reaction product gives an almost clear aqueous solution. 18 parts of triethanolamine are then added, the whole is stirred and cooled, to furnish a colourless, waxy substance which is readily soluble in water.

Manufacturing instruction B

A mixture of 120 parts of a polyethyleneglycol of molecular weight 1540 and 120 parts of a butanolic solution of about 75% dry content of a dimethylolurea-n-butyl ether is heated for 45 minutes at 100° C. under vacuum, to yield 224 parts of a colourless, waxy, water-soluble curable product, and 16 parts of n-butanol are recovered.

Manufacturing instruction C

A mixture of 206 parts of aqueous formaldehyde of 36.5% strength, 230 parts of butanol, 60 parts of urea and 8 parts of ammonia of 25% strength is heated in a stirring flask equipped with a descending condenser for 2 hours at 96° C., during which a total of 32 parts of a mixture of butanol and water distils off. The batch is then cooled to about 50° C. and a solution of 1 part of 85% phosphoric acid in 20 parts of butanol is added. The batch is then heated under vacuum to 80° C., during which water and butanol pass over. The water is separated from the distillate, whereas the butanol flows back into the reaction vessel. After about 4 hours the product has become practically free from water and miscible with benzene in any proportion. 31 parts of lauryl alcohol and 44 parts of ethyleneglycol are then added and the mixture is further heated under vacuum to 80° C., with 100 parts of butanol passing over. 20 parts of finely powdered, dry sodium metabisulphite ($Na_2S_2O_5$) are then added and the batch is stirred for about 1 hour longer at 80 to 90° C. until the reaction product has become soluble in water. The condensation is interrupted by stirring in 8 parts of triethanolamine and the whole is cooled, to yield 260 parts of a viscous, colourless substance which is vigorously stirred with an equal amount of water. The resulting water-in-oil emulsion separates into 2 layers when it is allowed to stand. The salt solution is decanted and a transparent resin is obtained which is readily soluble in much water.

Manufacturing instruction D

A mixture of 1760 parts of aqueous formaldehyde of 36.5% strength and 54 parts of ammonia of 25% strength is heated while being stirred. At about 60° C. 378 parts of melamine are added, and the whole is heated at 90 to 95° C. until a clear solution has formed. In the course of 25 minutes a mixture of 400 parts of methanol and water is then distilled off under vacuum. 1466 parts of n-butanol are added and the batch is further distilled under vacuum. The 400 parts of water eliminated by the water+butanol mixture are separated, and the butanol is allowed to run back into the reaction vessel. 10 parts of formic acid of 85% strength in 16 parts of n-butanol are then added and during 1 hour 1050 parts of aqueous n-butanol are distilled off. The resulting resinous condensation products gives a clear solution in an equal quantity of toluene. 585 parts of a polyglycol ether of molecular weight 1500 and 7 parts of glacial acetic acid are then added and the batch is condensed at 95° C. for 5 to 6 hours under reflux, to yield 2426 parts of a substance which on cooling turns waxy and gives a strongly turbid solution in water and a clear solution in toluene.

Manufacturing instruction E

As described for the reactive tenside in Swiss specification No. 301,453.

EXAMPLE 1

450 parts of a 1% solution of the red vat dyestuff of the formula

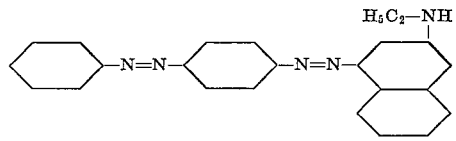

in tricresylphosphate are emulsified with a suitable apparatus in a solution of 150 parts of the tenside prepared according to manufacturing instruction A in 250 parts of water. This primary emulsion is mixed with 12 parts of glacial acetic acid, whereby its pH value is lowered to about 4.0. The batch is then stirred and gradually heated on a water-bath at 90 to 95° C. until a specimen of the reaction mass, diluted with a small amount of water, is substantially completely retained by ordinary filter paper. The mass formed is allowed to cool, a solution of 150 parts of the above-mentioned tenside A in 150 parts of water is added and once more dispersed to form a so-called secondary emulsion. When an absorbent paper is brushed with this secondary emulsion no tricresylphosphate runs out (in contrast to the primary emulsion) and a dry, non-tacky coating is obtained. The paper coated in this manner may be used as a copying paper because under a locally applied pressure the encapsulated dyestuff solution runs out and produces an imprint on paper brought into contact with it.

A corresponding, black colour effect is obtained when the 1% dyestuff solution in tricresylphosphate is replaced by a dilute alkyd resin lacquer pigmented with channel black, which has, for example, the following composition:

| | Parts |
|---|---|
| Phthalic acid glycerol resin modified with 40% linseed oil ("Plusol O") | 45 |
| Channel black | 25 |
| Dibutyl phthalate | 380 |
| | 450 |

EXAMPLE 2

30 parts of the azo pigment from diazotized 1-amino-2-methyl-4-chlorobenzene and 2-hydroxynaphthalene-3-carboxylic acid-2'-methyl-4'-chlorophenylamide are dispersed by means of a ball mill in a solution of 15 parts of the tenside A in 105 parts of water. The (primary) pigment dispersion is mixed with 4 parts of formic acid of 85% strength and heated on a waterbath at 95° C. while being stirred. After about 30 minutes the reaction product turns thickly liquid, and 50 parts of water are added. The mixture is further heated at 90 to 95° C. until a specimen diluted with water runs clear and colourless through a filter. The product is then suctioned off and rinsed with 2× 50 parts of hot water. The filtrate contains about 7.5 parts of polyglycol ether of a mean molecular weight of 4000, as well as some salt and hexamethylenetetramine. There are obtained 105 parts of filter cake containing about 28.5% of pigment dyestuff and 7.5% of melamine resin which envelops it. There are then added 15 parts of tenside A and 30 parts of water and the whole is once more dispersed on a wet colour mill, to furnish a thinly viscid paste (secondary pigment dispersion) which contains 20% of pigment dyestuff and whose pH value is adjusted to 7.9 by addition of triethanolamine. The pigment dispersion is distinguished by a medium, uniform degree of dispersion and has a covering power substantially greater than that of the primary dispersion. When the paste is dried, it forms a soft, easily dispersible, dustfree pigment powder.

EXAMPLE 3

135 parts of paraffin oil are emulsified with a high-speed agitator in a solution of 45 parts of tenside A in 45 parts of water, and 4 parts of glacial acetic acid are then added to the emulsion. The batch is stirred on a waterbath within 45 minutes to 95° C. and then further heated at this temperature. When the reaction mass has become so thick that it can hardly be stirred any longer, 75 parts of hot distilled water are added. The batch is further heated until a specimen diluted with water gives on filtration a clear filtrate. When this is the case, the product is suctioned off and the filter cake rinsed with 2× 50 parts of hot water. There are obtained 204 parts of a filter cake containing about 66% of encapsulated paraffin oil.

140 parts of the filter cake are mixed in a homogenizer with 420 parts of a 50% aqueous dispersion of a copolymer from 85 parts of acrylic acid isobutyl ester, 10 parts of acrylonitrile and 5 parts of acrylic acid, 20 parts of ammonia of 25% strength, and 420 parts of a paraffin wax emulsion containing 10% of tenside A and 50% of hard paraffin wax melting at 60 to 62° C.

There are obtained 1000 parts of a viscid, readily brushable mass which is applied in a thin layer to a cotton fabric and hardened for 5 minutes at 150° C., whereupon it forms a coating which repels water but is permeable to air.

EXAMPLE 4

750 parts of a lubricating oil of medium viscosity are emulsified by means of a high-speed agitator in 500 parts of an aqueous solution of 50% strength of tenside A. The resulting emulsion is mixed with 25 parts of glacial acetic acid and gradually heated to 90 to 95° C. on a water-bath. The mass turns thick; 400 parts of hot water are added and the whole is stirred at 90° C. until a specimen diluted with water gives a clear filtrate, then neutralized with 28.4 parts of ammonia of 25% strength, the resulting capsule magma is suctioned off and thoroughly washed with distilled water. The yellowish filter cake is dried under vacuum; it has the consistency of a fat or wax and may be used as a solid lubricant; it contains about 87% of lubricating oil in 13% of an envelope of melamine resin.

EXAMPLE 5

In a solution of 100 parts of tenside B in 250 parts of water an emulsion is prepared from 500 parts of a butanolic solution of a dimethylolurea-n-butyl ether having a dry content of about 75%, which solution was used for the manufacture of the tenside, and the resulting salve-like resin emulsion is diluted with 200 parts of water. 10 parts of formic acid of 85% strength are then added and the whole is heated for 30 minutes at 95° C. on a water-bath, then allowed to cool to 20° C., neutralized with 5 parts of ammonia of 25% strength, and the reaction product is poured out in a thin layer and dried under vacuum. There are obtained transparent, flexible gel foils displaying a distinct capsule structure which are storable for lengthy periods at room temperature. When they are heated at an elevated temperature, for example for 15 minutes at 150° C., the foils are completely cured right through. When such a foil is pressed between two surfaces, for example of wood, a water-free cemented article is obtained.

EXAMPLE 6

A solution of 50 parts of tenside C in 100 parts of toluene is left to itself until it has formed a sediment and turned clear. By means of a high-speed agitator 100 parts of an aqueous solution of 5% strength of mono-ammonium phosphate ($NH_4H_2PO_4$) are emulsified in the clear, weakly viscous solution. The resulting water-in-oil emulsion is heated for about 4 hours at 50° C. on a water-bath while being vigorously stirred. At the start the emulsion separates into 2 layers when left to itself. However, as the reaction progresses the mono-ammonium phosphate solution is encapsulated and remains on the filter in the form of a gelatinous residue, whereas the toluene is obtained as a clear filtrate. As soon as the completion of the reaction has been determined by way of this filter test, 15 parts of triethanolamine are added to the reaction mixture, whereby the acid formed is neutralized. Another 50 parts of the above-mentioned clear toluene solution are then added and the mixture is stirred with a high-speed agitator until the capsules formed have distributed evenly, which can be checked under a microscope. The major portion of the capsules have a diameter of $10\mu$. When left to stand in the toluene solution the capsules gradually sediment in the form of a voluminous mass, but it is always easy to stir them up again and to disperse them in an organic medium, such as a lacquer, a polymer solution or the like.

The capsule preparation may be used, for example, for the manufacture of porous masses or coatings in the following manner: 45 parts of a 40% solution of a copolymer from 30% of vinyl acetate, 65% of n-butyl acrylate and 5 parts of acrylic acid in ethyl acetate are mixed with 5 parts of a melamine resin etherified with butanol and 50 parts of the capsule preparation described above. The resulting mass is vigorously stirred and then brushed in a thin layer over cotton poplin. After drying, a waterproof coating is obtained which under a pressure of 100 cm. water head passes only 0.27 cm.³ of air per cm.² per minute. However, when the coating is heated for 5 minutes at 150° C., it turns porous and passes 3.5 cm.³ of air per cm.² per minute at a practically identical degree of waterproofness.

EXAMPLE 7

450 parts of molten hard paraffin wax (melting at 62° C.) are emulsified at 80° C. in a solution of 150 parts of the tenside A mentioned in Example 1 in 400 parts of water, and the whole is cooled to room temperature. A stable suspension is obtained whose particles have on an average a diameter of $1\mu$. The whole is diluted with 1000 parts of water and 50 parts of acetic acid of 80% strength and 25 parts of a 50% solution of ammonium nitrate are added, and the whole is left to itself for 2 to 3 days until a whey-like mass has settled out which is easy to filter. It is suctioned off and repeatedly washed with water. The white substance obtained after drying at 50° C. under vacuum contains about 85% of hard paraffin wax in an envelope of melamine resin; it cannot be melted in boiling water.

EXAMPLE 8

50 parts of reactive tenside D are dissolved in 100 parts of toluene and 6 parts of triethanolamine are added. 50 parts of solid ammonium chloride and 400 parts of glass beads of a diameter of about 4 mm. are then added; the whole is treated for 3 to 4 hours in a stirring mill, while cooling externally with water and, if necessary, adding further triethanolamine to ensure that the suspension contains no free acid. The voluminous ground material is then separated from the glass beads on a sieve and rinsed with a small quantity of toluene. The ammonium chloride suspension is then acidified with 3 parts of phosphoric acid of 85% strength and gently stirred at 50 to 60° C. After 3½ hours the resulting capsule mass is suctioned off and rinsed with toluene and n-butanol, dried under vacuum at 50° C. and then for one hour at 100° C., to yield a fine, easy-to-disperse, dry powder which may be used as a curing catalyst whose action is slightly slower than that of pure ammonium chloride.

EXAMPLE 9

15 parts of reactive tenside E and 20 parts of glacial acetic acid are dissolved in 65 parts of water heated at 80° C. By means of a high-speed agitator a solution of 1.5% of the dyestuff of the formula

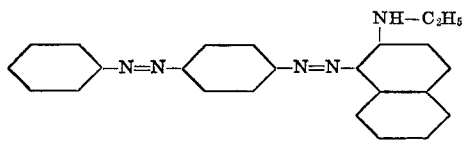

in 15 parts of paraffin oil is then emulsified in the cooled solution. The emulsion is heated for a few hours at 50 to 60° C., during which the paraffin oil is encapsulated, to form a whey-like, red substance which, when it is brushed over paper, dries to form a non-tacky coating and displays a copying effect.

I claim:
1. Process for encapsulating a substance which is finely dispersed by means of a tenside in a liquid, by forming a capsule shell insoluble in the liquid, wherein the substance to be encapsulated is dispersed in the presence of a tenside and maintained thereby in a finely dispersed state, said tenside containing both hydrophobic and hydrophilic groups and being selected from the group consisting of
(1) methylolmelamines or methylolureas, whose methylol groups are partially etherified with hydroxy compounds of the formula

where $n$ is a number from 1 to 100 and with monoalcohols containing 4 to 7 carbon atoms,
(2) water-soluble derivatives of methylolureas or methylolmelamines containing radicals of monohydroxy compounds with at least 4 carbon atoms, radicals of alcohols containing at least 2 hydroxyl groups and Me—$O_3$S— groups bound with carbon atoms, where Me is an alkali metal, and
(3) condensation products obtained by condensing together
(a) 1 mol of hexamethylolmelamine hexamethyl ether,
(b) 2 mols of a higher fatty acid, and
(c) 1 mol of triethanolamine,
and converting the resulting basic condensate with acetic acid into the salt,
and the tenside in the dispersion is then converted into the irreversibly insoluble state to form a capsule shell around the finely dispersed particles of the substance.

2. A process according to claim 1, wherein the tenside is a curable ether of a number selected from the group consisting of a methylolurea and methylolmelamine, whose methylol groups have been etherified with monoalcohols containing 4 to 7 carbon atoms and with polyethyleneglycols.

3. A process according to claim 1, wherein the tenside is a curable ether of methylolmelamine, whose methylol groups have been etherified with n-butanol and with polyethyleneglycol of molecular weight 4000.

4. A process according to claim 1, wherein the tenside is a methylolurea, whose methylol groups are partially etherified with hydroxy compounds of the formula

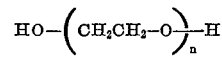

where $n$ is a number from 1 to 100 and with monoalcohols containing 4 to 7 carbon atoms.

5. Process for encapsulating a substance which is finely dispersed by means of a tenside in a liquid, by forming a capsule shell insoluble in the liquid, which comprises dispersing the substance to be encapsulated in the presence of a water-soluble derivative of a member selected from the group of a methylolurea and a methylolmelamine, containing radicals of monohydroxy compounds comprising at least 4 carbon atoms, radicals of alcohols containing at least two hydroxyl groups and Me—$O_3$S groups attached to carbon atoms, where Me represents an alkali metal, which derivative is capable of forming a compound insoluble in the dispersing liquid, and the derivative in the dispersion is then converted into the irreversibly insoluble state.

References Cited

UNITED STATES PATENTS

| | | | |
|---|---|---|---|
| 3,074,845 | 1/1963 | Geary | 424—32X |
| 3,111,407 | 11/1963 | Lindquist et al. | 117—36.8X |
| 3,151,027 | 9/1964 | Cooley et al. | 424—32X |

RICHARD D. LOVERING, Primary Examiner

U.S. Cl. X.R.

8—79; 71—64; 106—308; 117—36.7, 100, 135.5; 252—10, 429; 264—4; 424—32